United States Patent [19]

Grauel et al.

[11] Patent Number: 4,632,466
[45] Date of Patent: Dec. 30, 1986

[54] DUAL-CIRCUIT PRESSURE MEDIUM BRAKE SYSTEM

[75] Inventors: Ingolf Grauel, Vaihingen; Günter Kulke, Esslingen; Egbert Müller, Hochdorf; Werner Stumpe, Kornwestheim, all of Fed. Rep. of Germany

[73] Assignee: Robert Bosch, Stuttgart, Fed. Rep. of Germany

[21] Appl. No.: 415,858

[22] Filed: Sep. 8, 1982

[30] Foreign Application Priority Data

Mar. 17, 1982 [DE] Fed. Rep. of Germany ....... 3209592

[51] Int. Cl.$^4$ .............................................. B60T 13/10
[52] U.S. Cl. .......................................... 303/7; 303/15; 303/22 R; 303/118
[58] Field of Search ...................... 303/6 R, 6 A, 7, 8, 303/3, 9, 13, 14, 15, 16, 20, 22 R, 22 A, 50–56, 28–30, 40, 118, 23 R; 188/195, 151 A, 3 R, 106

[56] References Cited

U.S. PATENT DOCUMENTS

| 3,507,542 | 4/1970 | Cannella | 303/7 |
| 3,674,317 | 7/1972 | Mangold | 303/118 |
| 4,037,879 | 7/1977 | Horowitz | 303/23 R |

FOREIGN PATENT DOCUMENTS

| 10827 | 9/1956 | Fed. Rep. of Germany . |
| 1946446 | 3/1970 | Fed. Rep. of Germany . |
| 1085081 | 9/1967 | United Kingdom . |
| 1393776 | 5/1975 | United Kingdom .................... 303/7 |

Primary Examiner—Douglas C. Butler

[57] ABSTRACT

A dual-circuit pressure medium brake system is equipped with relay valves disposed ahead of the brake cylinders. Each brake circuit is equipped with a control also acting in the other circuit and overlapping each other, and a primary brake circuit is designed in such a way that it contains all control elements necessary for optimal brake pressure adaptation, while a secondary brake circuit is merely an auxiliary brake circuit without control elements. In this manner each brake pressure metering can be simultaneously adjusted. During the loss of the primary brake circuit, the secondary brake circuit guarantees a minimal brake pressure. Such a pressure medium brake system is preferably used in air brake systems of motor vehicles.

4 Claims, 2 Drawing Figures

DUAL-CIRCUIT PRESSURE MEDIUM BRAKE SYSTEM

BACKGROUND OF THE INVENTION

The present invention is based on a dual-circuit pressure medium brake system and method with dual-circuit pressure medium storage and with a dual-circuit control valve as well as with a relay valve intended for each brake circuit, where the storage pressure is available and which can be controlled by the dual-circuit control valve. Such a brake system is known (German Patent Application No. W 10827).

In such a known brake system the relay valve can only be controlled by a single circuit. In case of a defect in the control circuit this may lead to a loss of the braking pressure.

It is further known already to provide in one of the two circuits of a dual-circuit pressure medium brake system additional control elements, as for instance a load-dependent brake pressure control (German Offenlegunsschrift No. 19 46 446). However, because of the loss of time in one of the brake circuits a simultaneous brake pressure metering in both brake circuits cannot take place.

OBJECT AND SUMMARY OF THE INVENTION

In contrast to the foregoing, the dual-circuit pressure medium brake system and method as revealed hereinafter and finally claimed has the advantage of a simultaneous brake pressure metering for all brake cylinders. Therefore, there is no phase shift because of time loss between the primary and secondary circuits.

There is the additional advantage that during a partial failure, for instance in the primary control circuit, a minimum of brake pressure is assured.

The invention will be better understood and further objects and advantages thereof will become more apparent from the ensuing detailed description of preferred embodiments taken in conjunction with the drawings.

BRIEF DESCRIPTION OF THE DRAWINGS

Two exemplary embodiments of the present invention are shown in the drawings and further explained in the following description.

DESCRIPTION OF THE PREFERRED EMBODIMENTS

Figure 1:
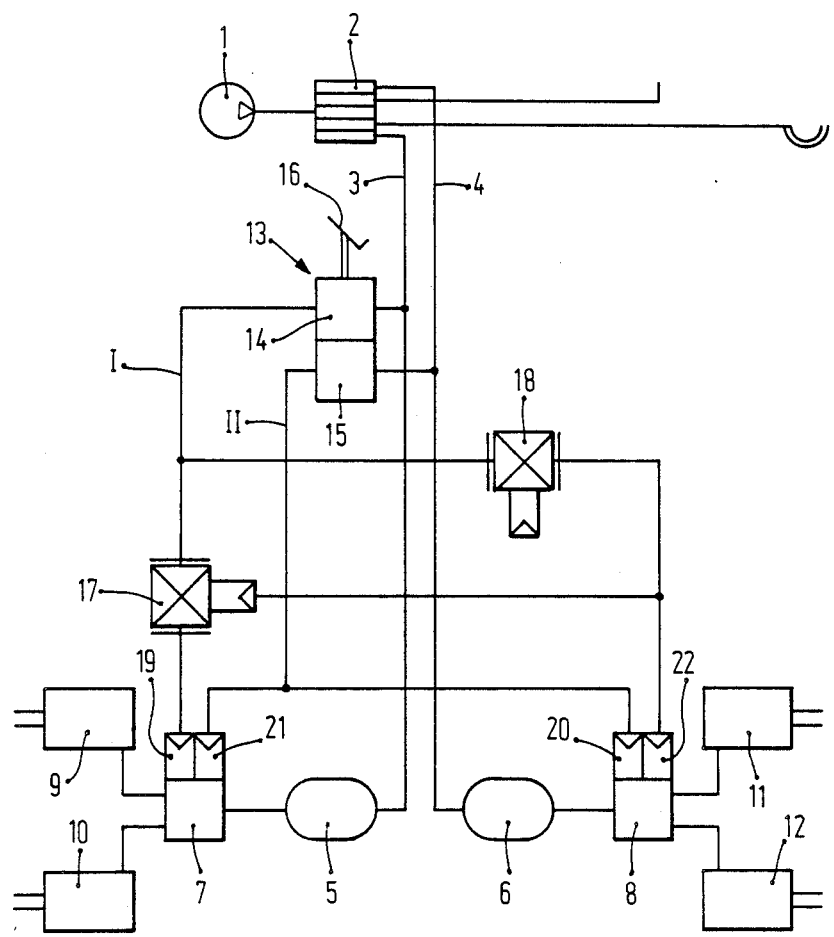
FIG. 1 shows a brake system with an air-pressure control circuit.

A dual-circuit air brake system is supplied with compressed air by a compressor 1 by way of a four-circuit safety valve 2, connected to its output side, and the compressed air needed in a tractor vehicle for semi-trailers, for example, is stored in two tractor supply tanks 5 and 6, supplied by supply lines 3 and 4. A relay valve 7 or 8 such as shown in the prior art in British Pat. No. 1,393,776 is connected to the output side of each of the supply tanks 5 and 6, and two brake cylinders 9 and 10 or 11 and 12 of a front or rear axle are connected to each relay valve 7 or 8. A connection to a dual-circuit brake valve 13 is provided in the supply lines 3 and 4, which is provided with two single valves 14 and 15. Single valve 14, placed next to a pedal 16, monitors a primary control circuit I, and the other single valve 15 monitors a secondary control circuit II. A number of control elements 17 and 18 are disposed in the primary control circuit I, namely a brake pressure reducer 17 and a load-dependent brake pressure control 18. A control element 19 or 22 is controlled by way of the control elements 17 and 18, the former being placed on one of the two relay valves 7 or 8 and making it possible to reverse the relay valve 7 or 8.

Each relay valve 7 or 8, however, also has a second control element 21 or 20, disposed parallel to the first, which can be directly controlled by way of the second single valve 15, i.e., without intervening control elements. Such an arrangement allows for an overlapping control, i.e., the primary control circuit I as well as the secondary control circuit II activate the front axle brake cylinder 9 and 10 as well as the rear axle brake cylinder 11 and 12.

The primary control circuit I is in all cases supplied on a priority basis because of a special configuration of the dual-circuit brake valve 13, so that in the case of an intact braking system the primary control circuit I is in charge and activates the brakes. The control circuit I guarantees rapid signal transmission and the corresponding metering of the brake pressure. In case of a loss or malfunction in the primary control circuit I the primary control circuit would not function to operate pressure controls 19 and 22 of valves 7 and 8 respectively, to operate the brakes, the secondary control circuit II will function to operate pressure controls 21 and 20 of relay valves 7 and 8 respectively, which would permit operation of valves 7 and 8 and consequently the brakes of the front and rear wheels by which the secondary control circuit supplies a minimal brake effort of the auxiliary brakes.

Figure 2:
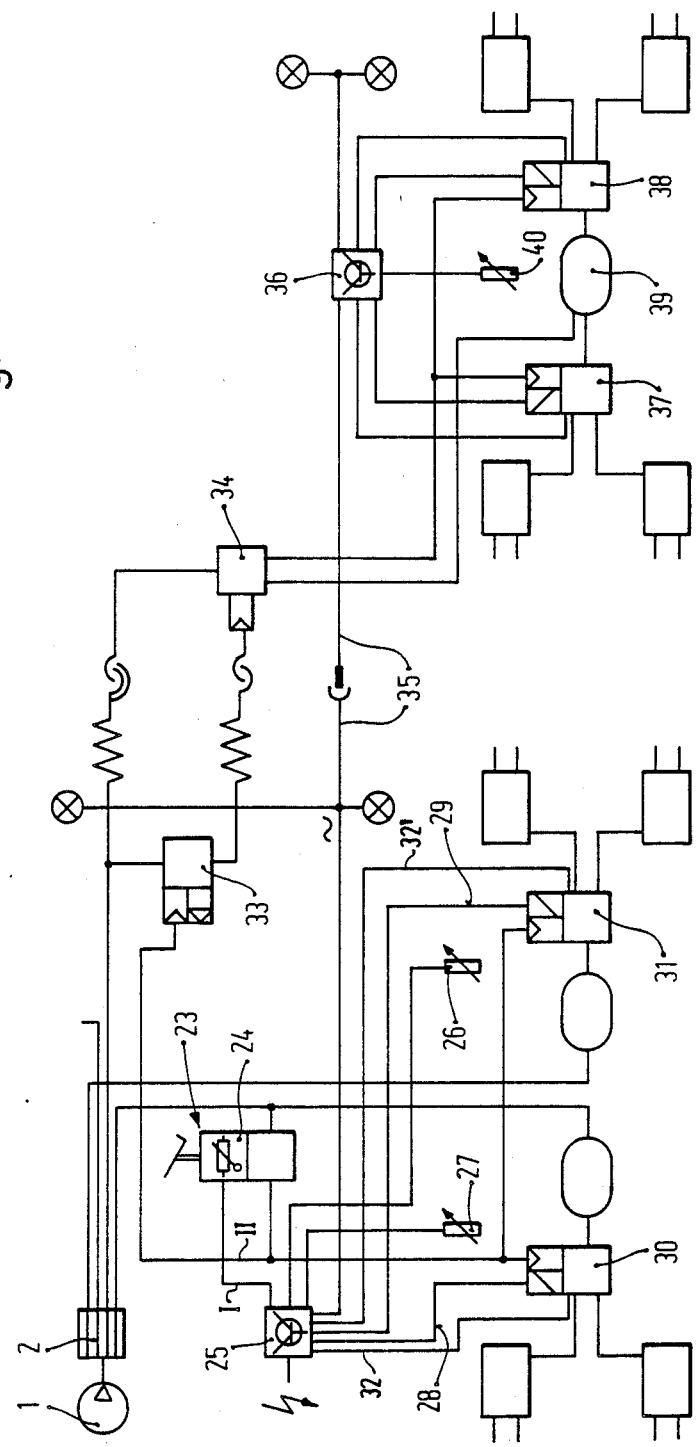
FIG. 2 shows a brake system with electric air-pressure control circuit.

FIG. 2 shows an electrical dual-circuit air brake system. Herein the parts corresponding to those in the embodiment of FIG. 1 have the same reference numerals.

A dual-circuit brake valve 23 shown in the prior art in U.S. Pat. No. 3,507,542 is used, having an electric current supply 24 in the primary control circuit I. Therefore the entire primary control circuit I is electrically designed with an electronic control 25 which can be fed the signals of load sensors 26 such as shown in the prior art in U.S. Pat. No. 4,037,879 and brake pressure sensors 27 and at 32 and 32' from which electrical signals over lines 28, 29, and 35 may be directed to different electrical elements. By way of control lines 28 and 29 the control 25 is connected with a control of relay valve 30 for the front axle as well as to a control of relay valve 31 for the rear axle. In addition there is a line 32 or 32' leading to pressure sensors not shown, which are integrated into the relay valves 30 and 31.

By way of a tractor-trailer pressure controlled element 33, a trailer brake pressure controlled element 34 and an electrical line 35, leading back from the electronic control 25, a trailer brake system with its own electronic control 36 and two relay valves 37 and 38 as well as a trailer supply tank 39 is connected to the brake system described. Each relay valve 37 or 38 again has an electric and pressure activated dual-circuit control and is overlappingly controllable, the same as the tractor. The electronic trailer control 36 is equipped to receive signals from load or brake pressure sensors 40, which are, however, only intended for a primary control circuit.

With this type of construction the electrical transmission of the signal leads to an especially rapid reaction of the brakes. The electrical primary control circuit I allows for a rapid transmission of the signals to the corresponding metering of the brake pressure by which the brakes are activated and controlled.

In operation of the dual brake system of FIG. 2, the pedal is pressed down to cause an electrical signal from section 24 of control 23. The electrical signal actuates electronic control 25 which receives signals from sensors 26 and 27 and sensors connected to lines 32 and 32'. The electronic control 25 then sends a signal to relays 30 and 31, and to electronic control 36. Relays 30 and 31 operate the tractor brakes via a signal from electronic control 25 and relays 37 and 38 operate the trailer brakes via a signal from electronic control 36. During pressing down on the brake pedal, the fluid pressure valve of the control 23 is opened to permit fluid pressure to flow to the fluid pressure controls of the relay valves 30, 31 and to valve 33. Since the electrical signal travels at a faster rate than the build-up of the fluid pressure on the controls of the relay valves, the electric signal will function to operate the relay valves 30, 31 and 37, 38 to permit fluid flow to the brakes of the tractor and trailer respectively. If the electrical circuit is not operative, then the secondary brake circuit operates via the compressed air control section of control 23. Compressed air is directed to relays 30 and 31 for control of the tractor brakes and also to the trailer relays 37 and 38 via controls 33 and 34. Therefore, if the primary system is not operative, the secondary system operates the brakes.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A compressed air brake system for a tractor-trailer combination comprising a tractor braking system for controlling front and rear fluid actuated brake cylinders, pedal-actuated, dual-circuit brake control means (23, 24) actuatable to cause an electrical signal to be delivered to a control element means (25) interposed in a primary control brake circuit (I) of the tractor braking system whereupon said control element means (25) sends an electrical signal to respective electrically actuated elements of a pair of dual-controllable relay valves (30, 31) disposed for controlling said front and rear brake cylinders, said relay valves being connected to separate and independent first and second fluid pressure medium tanks, respectively, said first pressure medium storage tank supplying fluid only to said front tractor brake cylinders and said second pressure medium storage tank supplying fluid only to said rear tractor brake cylinders, a secondary control brake circuit (II) of the tractor braking system, without interposition of any said control element means (25), operable upon failure of said primary brake circuit (I) to deliver compressed air from fluid supply pump means (1) directly to said dual-controllable relay valves (30, 31) via a fluid pressure valve of said dual-circuit brake means (23, 24) to actuate fluid pressure actuated elements of said dual-controllable relay valves (30, 31) delivering fluid pressure from said first and second fluid pressure medium tanks to said tractor front and rear brake cylinders, respectively, a trailer braking system including fluid brake cylinders actuatable by said dual-circuit brake means (23, 24) to control dual-controllable relay valves (37, 38) connected to a common supply pressure medium tank (39), wherein the combination further includes a tractor-trailer control means (33) disposed between said dual-circuit brake control means (23, 24) and a trailer brake element means (34) for actuation of said trailer brake cylinders via said trailer relay valves (37, 38), the trailer braking system including additional electric control element means (36) between said tractor control element means (25) and said trailer dual-controllable relay valves (37, 38).

2. A dual-circuit pressure medium brake system in accordance with claim 1, wherein said dual-circuit controllable relay valves are disposed ahead of said brake cylinders of each axle of said vehicle, and said primary control circuit comprises an electronic control means having a signal input from load and brake pressure.

3. A dual-circuit pressure medium brake system in accordance with claim 2, wherein said relay valve is supplied with a signal means responsive to pressure values.

4. A dual-circuit pressure medium brake system in accordance with claim 2 for use with a tractor-trailer combination, having additional brake means for said trailer which is controlled by a trailer brake control means including additional dual brake control circuits, and an additional control element means, said primary circuit being connected to said additional control element means for actuating said brakes of said trailer.

* * * * *